US008042051B2

(12) United States Patent (10) Patent No.: US 8,042,051 B2
Jerrard-Dunne et al. (45) Date of Patent: Oct. 18, 2011

(54) APPARATUS FOR NAVIGATION AND INTERACTION IN A VIRTUAL MEETING PLACE

(75) Inventors: Stanley Jerrard-Dunne, Dublin (IE); Michael Roche, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 12/130,598

(22) Filed: May 30, 2008

(65) Prior Publication Data

US 2009/0300521 A1 Dec. 3, 2009

(51) Int. Cl.
*G06F 3/048* (2006.01)
(52) U.S. Cl. ......... 715/757; 715/746; 715/750; 715/751
(58) Field of Classification Search .................. 715/757, 715/746, 751
See application file for complete search history.

(56) References Cited

U.S. PATENT DOCUMENTS

| | | | | |
|---|---|---|---|---|
| 6,119,147 | A * | 9/2000 | Toomey et al. | 709/204 |
| 6,934,747 | B1 * | 8/2005 | McGrath et al. | 709/224 |
| 7,386,799 | B1 * | 6/2008 | Clanton et al. | 715/758 |
| 7,809,789 | B2 * | 10/2010 | Shuster | 709/203 |
| 2002/0154174 | A1 * | 10/2002 | Redlich et al. | 345/848 |
| 2007/0011273 | A1 * | 1/2007 | Greenstein et al. | 709/217 |
| 2007/0050716 | A1 * | 3/2007 | Leahy et al. | 715/706 |
| 2008/0215994 | A1 * | 9/2008 | Harrison et al. | 715/757 |
| 2008/0268418 | A1 * | 10/2008 | Tashner et al. | 434/365 |
| 2009/0089685 | A1 * | 4/2009 | Mordecai et al. | 715/757 |
| 2009/0112538 | A1 * | 4/2009 | Anderson et al. | 703/6 |
| 2009/0172538 | A1 * | 7/2009 | Bates et al. | 715/706 |
| 2009/0172539 | A1 * | 7/2009 | Bates et al. | 715/706 |
| 2009/0217171 | A1 * | 8/2009 | Hamilton et al. | 715/736 |
| 2009/0222742 | A1 * | 9/2009 | Pelton et al. | 715/753 |
| 2009/0271714 | A1 * | 10/2009 | Cox et al. | 715/753 |
| 2009/0276802 | A1 * | 11/2009 | Amento et al. | 725/32 |

OTHER PUBLICATIONS

This dissertation is submitted in partial fulfillment of the requirements for the degree of Doctor of Philosophy (Ph.D.) at the IT University of Copenhagen; Lisbeth Klastrup; 2001; 392 pages; http://www.uio.no/studier/emner/hf/imk/MEST3726/v05/Klastruphesis.pdf.*
Pfister, H-R et al., The Metaphor of Virtual Rooms in the Cooperative Learning Environment Clear, CoBuild '98, Darmstadt (1998).
Sanchez, J.A. et al., Agora: Enhancing Group Awareness and Collaboration in Floristic Digital Libraries, CRIWG '98, Fourth International Workshop on Groupware, Rio de Janeiro (1998).

(Continued)

*Primary Examiner* — Steven Sax
*Assistant Examiner* — Linh Pham
(74) *Attorney, Agent, or Firm* — Cantor Colburn LLP; Raymond Szeto

(57) ABSTRACT

An apparatus for providing for virtual communication and collaboration comprises a collaborative virtual environment (CVE) application executing within a distributed data processing system, and a navigation module implemented within the CVE application. The CVE application provides a virtual world represented as a grid of an interconnected set of locations each divided into a set of zones and each having an assigned context through a user interface provided to a plurality of users through one or more client systems. The CVE provides each user with a respective avatar representation for navigating and interacting within the locations of the virtual world. The navigation module provides a user interface element and automatically directs the avatar representation to traverse the set of zones the set of locations of the virtual world in a particular order of locations and at a particular.

4 Claims, 4 Drawing Sheets

OTHER PUBLICATIONS

Prasolova-Forland, E. and Divitini, M., Supporting learning communities with collaborative virtual environments: Different spatial metaphors, Proc. of the 2003 International ACM SIGGROUP conference on Supporting group work, Florida (2003).

Mahfujur Rahman, A.S.M. and El Saddik, A., A 3D Notice Board Metaphor for Visualizing, Categorizing, and Sharing Learning Objects, Second International Conference on Systems (ICONS'07).

Kaplan, S. et al., Stepping into Cooperative Buildings, First Australasian User Interface Conference (2000).

Pfister, H-R et al., Rooms, Protocols, and Nets: Metaphors for Computer Supported Cooperative Learning of Distributed Groups, Proc. of the Third Intl Conf. on the Learning Sciences (ICLS-98), Atlanta (1998).

Park, K.S. et al., Distance Learning Classroom Using Virtual Harlem, Proc, of the Seventh International Conference on Virtual Systems and Multimedia (VSMM'01) (2001).

Hampel, T. and Keil-Slawik, R., s-Team—Designing an Integrative Infrastructure for Web-Based Computer-Supported Cooperative Learning, Proc. of the Seventh International Conference on Virtual Systems and Multimedia (VSMM'01) (2001).

* cited by examiner

APPARATUS FOR NAVIGATION AND INTERACTION IN A VIRTUAL MEETING PLACE

CROSS REFERENCE TO RELATED APPLICATIONS

The present application is co-pending with the concurrently filed application, entitled "APPARATUS FOR NAVIGATION AND INTERACTION IN A VIRTUAL MEETING PLACE," assigned to the assignee of the present application, the contents of which are incorporated herein by reference in their entirety.

BACKGROUND OF THE INVENTION

1. Field of the Invention

Exemplary embodiments of the present invention relate to computer-based virtual worlds, and more particularly, to navigation and interaction in computer-based virtual worlds implemented as a metaphor for real-world meeting places.

2. Description of Background

The existence of an environment where people can have and share experiences is acknowledged as a primary requirement for effective communication and collaboration. Thus, collaboration in the real world typically occurs at specific locations at which people can see and hear each other, and thereby can communicate. The physical locations where people meet have boundaries (for example, walls) that separate the locations from one another. These boundaries server to limit what people can see and hear, and therefore allows these locations to provide a means to structure collaboration. Physical locations can also provide a means to structure information. Information objects such as books, notes, and presentations can be placed in a location and arranged in sublocations to enable people to find and organize specific information. Furthermore, physical locations can be designed for specific types of work or collaboration. For example, an individual's office is designed for individual work, while a conference room is designed for cooperative work among multiple participants.

The development of computer-mediated communication has created potential for people to collaborate and interact with others in new ways. For example, a collaborative virtual environment (CVE) is a computer-based, distributed, virtual space where people can meet and interact with other, with agents, or with virtual objects. CVEs are implemented to reflect real world interaction by providing a text-based system for interaction or a two or three-dimensional graphical virtual world that is visualized for virtual interaction. Virtual worlds are built on coding protocols that use the metaphor of an imaginary place or the real world without its physical limitations to define what can and cannot be done. A virtual world can be represented using graphics, images, video, force feedback, and audio data to define a representation of a place that can be accessed by one or more users within a distributed computer system. Typically, the virtual world enables multiple users to simultaneously perceive and interact with the virtual world and with each other through different computers that are connected by a network. For example, virtual communities such as Linden Lab's "Second Life" provide a three-dimensional, persistent virtual world in which users interact with each other (socially and economically), the local environment, and with software agents using virtual characters in a cyber space. The degree of interaction between the users and the virtual world is implemented by one or more computer applications that govern such interactions as simulated physics, exchange of information between players, and the like.

User participation in a virtual world can be driven by, for example, social, educational, and business motivations. While virtual worlds have primarily been adopted to offer a new spaces for promoting socialization, they have also exhibited potential to support collaboration by providing new ways to communicate and increasing the awareness of the participants and available resources, without the physical space and time constraints of the real world. For example, while an individual who is geographically distant from a location where an impromptu conference is being held would be physically unable to attend to conference (for example, the individual may be an employee at an off-site location or a satellite office), this individual would be able to participate in such a conference were it held in a virtual world via a network. Nevertheless, the limitations of the provided for virtual communication may still prevent this individual from sharing physical information objects such as notes, papers, and presentations with the other participants. Therefore, while virtual worlds provide a mechanism through which better and more effective collaboration can be enabled by providing new ways for people to interact and communicate, the nature of the interactions between users in a virtual world is limited by the constraints of the system implementing the virtual world.

Accordingly, it desirable to implement information and communication technologies to support large-scale, distributed enterprises to improve the efficiency and quality of collaboration, communication, and information gathering and dissemination.

SUMMARY OF THE INVENTION

The shortcomings of the prior art can be overcome and additional advantages can be provided through exemplary embodiments of the present invention that are related to an apparatus providing for virtual communication and collaboration. The apparatus comprises a collaborative virtual environment application executing within a distributed data processing system and accessible to a plurality of users through one or more client systems communicatively connected via a network, and a navigation module implemented within the collaborative virtual environment application. The collaborative virtual environment application provides a persistent virtual world represented as a grid of an interconnected set of locations each divided into a set of zones and each having an assigned context. The users of the plurality of users simultaneously and continuously perceive and interact with the persistent virtual world through a user interface provided to the plurality of users through the one or more client systems. The collaborative virtual environment provides each user of the plurality of users with a respective avatar representation for navigating and interacting with each other user of the plurality of users and objects within the locations of the persistent virtual world. The navigation module provides a user interface element implemented within the user interface for each user of the plurality of users to specify a respective set of navigation settings. The navigation module automatically directs the avatar representation for each user of the plurality of the users to traverse the set of zones of a respective subset of the set of locations of the persistent virtual world in a particular order of locations and at a particular rate for each location. The navigation module determines the particular order of locations and the particular rate for each location for each user according to the respective set of navigation settings specified by the user.

The shortcomings of the prior art can also be overcome and additional advantages can also be provided through exemplary embodiments of the present invention that are related to methods, computer program products, and data processing systems corresponding to the above-summarized apparatus are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution that can be implemented to provide methods and systems that can be utilized within a CVE provided by a distributed data processing system that comprises one or more navigable virtual worlds that each include of a number of locations, where each location has an associated topic of interest.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention may be implemented within a collaborative virtual environment (CVE) provided by a distributed data processing system in which multiple computing devices are utilized along with one or more data networks. Such systems can allow for people all over the world to participate and interact with each other in a CVE. For instance, exemplary embodiments can be implemented within a CVE provided by a client/server system that includes a central server system that is commonly accessed by each user through a client system connected via a network such as an Internet or Intranet to the central server system. As such, multiple users are able to interact with each other as well as the CVE by accessing the central server system via their client systems. Alternatively, exemplary embodiments can be implemented within a CVE provided by a distributed system such as a peer-to-peer network that includes at least two client systems.

Figure 1:
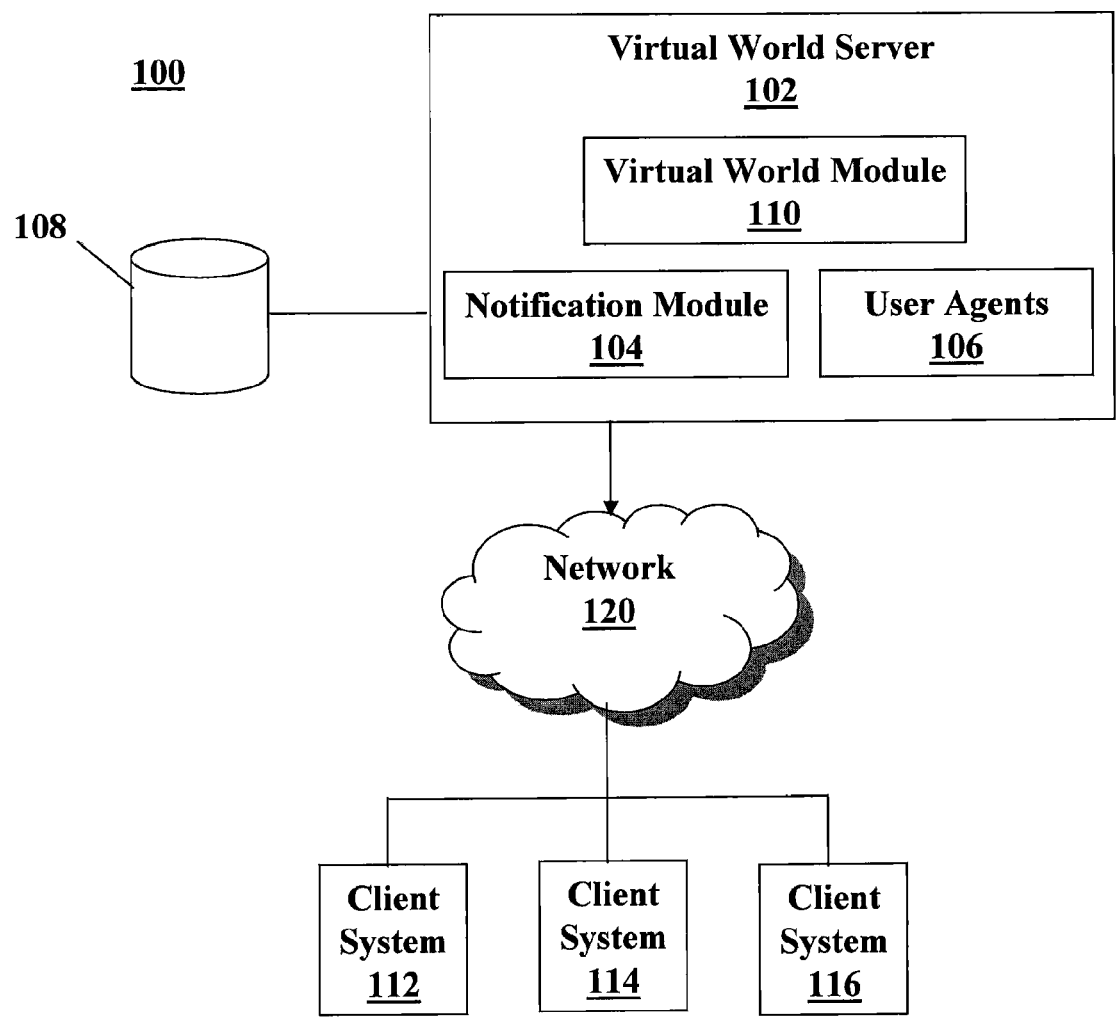
FIG. 1 is a block diagram illustrating an exemplary distributed data processing system in which exemplary embodiments of the present invention may be implemented.
Figure 2:
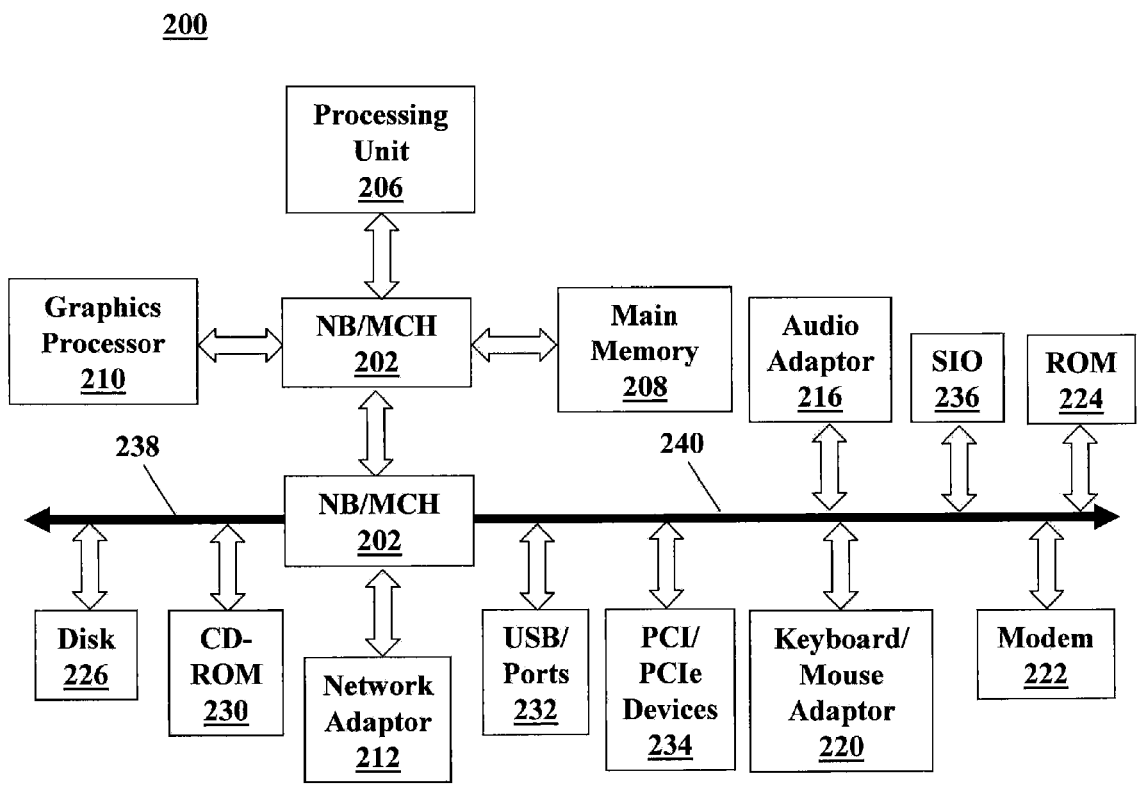
FIG. 2 is a block diagram illustrating an exemplary data processing system in which exemplary embodiments of the present invention may be implemented.

Accordingly, FIGS. 1 and 2 hereafter are provided as illustrative examples of a distributed data processing environment and computing devices within which exemplary embodiments may be implemented. It should of course be noted that FIGS. 1 and 2 are exemplary only and are not intended to state or imply any limitation with regard to the types and/or configurations of computing devices within which exemplary embodiments may be implemented. Many modifications to the computing devices and environments depicted in FIGS. 1 and 2 may be made without departing from the spirit and scope of the present invention.

Referring now to FIG. 1, an exemplary distributed data processing system within which exemplary embodiments of the present invention may be implemented is illustrated. Distributed data processing system 100 is a client-server system providing capabilities for real-time interaction and exchange of information between client and server machines. System 100 contains at least one network 120, which is the medium used to provide communication links between various devices and computers connected together within the distributed data processing system. Network 120 may include connections such as wire, wireless communication links, or fiber optic cables. System 100 can be implemented using standard network and security protocols.

In the example depicted in FIG. 1, a virtual world server 102 is connected to network 120, along with storage unit 108. In addition, clients 112, 114, 116 are also connected to network 120. Clients 112, 114, 116 may be, for example, personal computers, network computers, or the like. In this instance, clients 112, 114, 116 are clients to server 102. Server 102 may provide data, such as boot files, operating system images, and applications to clients 112, 114, 116. Distributed data processing system 100 may include additional servers, clients, and other devices not shown.

More particularly, distributed data processing system 100 may be implemented to provide for a CVE. Server 102 can be configured to maintain a persistent virtual world for clients 112, 114, 116. More particularly, system 100 includes a virtual world application or module 110 that is stored on server 102. A virtual world represents a real or imaginary place using graphics, images, video, force feedback, and audio data to define a representation of the place on a computer for one or more users. The virtual world enables multiple users to simultaneously perceive and interact with the virtual world and with each other through clients 112, 114, 116 that are connected by network 120.

Virtual world module 110 comprises software that runs continuously on server 102 to generate and persist the virtual world. In alternative exemplary embodiments, some or all of virtual world module 110 can be stored and/or run on server 102, and some or all of virtual world module 110 may be stored on individual clients 112, 114, 116. Regardless of the storage implementation for virtual world module 110, server 102 can be configured to facilitate interaction within the virtual world by multiple users of clients 112, 114, 116 concurrently. Server 102 and virtual world module 110 can be configured to handle and verify a large number of connections and apply changes (for example, bug fixes or added content) to the virtual world. Server 102 and virtual world module 110 can be configured to provide a system for recording virtual world data at regular intervals without stopping interaction between users within the virtual world.

In the present exemplary embodiment, the persistent virtual world provided by server 102 and virtual world module 110 is a representation of an environment with which users of clients 112, 114, 116 can interact. Thus, clients 112, 114, 116 may run client software that allows a user to interact with the persistent virtual world. The client software on clients 112, 114, 116 may provide access to the entire virtual world (for example, by implementing a graphical viewer program module), or further "expansions" may be made available to allow access to certain virtual sub-regions of the virtual world. A user is considered online in the collaborative virtual world when the user is logged into server 102 through a client and interacting with the persistent virtual world on a regular basis. Conversely, a user is considered offline when the user is not logged into server 102 through a client. The virtual world is persistent because the environment continues to exist and evolve even when a given user is not logged in. While online, users may interact with the virtual world using, for example, commands, keystrokes, or mouse clicks. Other user interfaces may use the cursor keys, mouse look, a top-down third-party perspective, a chase camera perspective, or any other suitable interface techniques.

Server 102 may run server software and maintain a database in storage 108 to track the states of objects, structures, and user representations in the persistent virtual world. In exemplary embodiments, server 102 may comprise any computing device (for example, one or more computers) capable of communicating with other computing devices. Server 102 can comprise a processor that is in communication with a storage device, such as an appropriate combination of RAM, ROM, hard disk, and other well-known storage media. In exemplary embodiments, server 102 may comprise any number of server components that operate to coordinate the activities and client interactions within the virtual world. Server 102 may comprise one or more personal computers, web servers, dedicated virtual world servers, client systems, any combination of the foregoing, or the like. Furthermore, any number of clients may be in communication with server 102. Typically, the number of clients connected at any given time changes repeatedly as different users login and logout of the virtual world.

In exemplary embodiments, clients 112, 114, 116 may each comprise any device capable of communicating with server 102, providing virtual world state information to a user, and transmitting the user's desired actions to the server. Each client device can comprise a processor that is in communication with a storage device, such as an appropriate combination of RAM, ROM, hard disk, and other well-known storage media. Suitable devices for clients 112, 114, 116 can include, but are not limited to, personal computers, video game consoles, mobile phones, and PDAs. In exemplary embodiments, it may be possible for multiple users to access server 102 via the same client device.

Clients 112, 114, 116 may render a two-dimensional or three-dimensional graphical representation of the persistent virtual world, although clients 112, 114, 116 may also represent the virtual world using text, as in earlier multi-user dungeons (MUDs). In exemplary embodiments, clients 112, 114, 116 are able to communicate with one another over network 120, and such communication may be facilitated by server 102. In exemplary embodiments, a user can register a user account (described in greater detail below) with server 102 and then interact with the virtual world and with other users in the virtual world provided by virtual world module 110. For example, a first user accessing virtual world module 110 via client 112 may be able to interact with a second user accessing the virtual world module via client 116. Each user typically interacts with the virtual world, and with other users within the virtual world, on behalf of, or from the perspective of, the user's virtual world representation. Users can be represented in a virtual world using graphical avatars. An avatar, which is typically a two or three-dimensional graphical representation of a humanoid, another graphical representation, or a text-based representation, essentially defines the user's appearance in the virtual world on a video screen. A user, through his or her avatar representation, may, for example, inhabit the world, navigate through the world to meet other users' avatars, and interact with objects in the world. Users may be provided with the option of customizing the appearance of their avatar by selecting facial features, body style, hair color, hair style, facial hair, and the like.

In exemplary embodiments, server 102 can be configured to maintain, host, and/or otherwise be in communication with a user account for each user that accesses virtual world module 110. A user account includes information related to a particular user. Accordingly, a user account may be a program and/or database that tracks various user-related data including, but not necessarily limited to, user ID, user character ID, user avatar attributes, etc. In exemplary embodiments, the user-related data for user accounts is stored on and accessed from a user database maintained by server 102 within storage device 108. In alternative exemplary embodiments, some or all of the user-related data can be stored on a database in communication with server 102, and some or all of the user-related data may be stored on a database in communication with individual clients 112, 114, 116.

Whenever a user interacts with the virtual world (or another user within the virtual world), an event is generated at that user's client and sent to server 102. The evolution of the virtual world is the result of events. The database maintained within storage device 108 contains the current state of the virtual world. The events cause changes to the virtual world and, thus, the database. The role of a client is essentially to represent these events graphically (or textually) to allow the user to monitor for events that are relevant to that user and to allow the user to perform appropriate actions by interacting with the client.

In exemplary embodiments, server 102 may be configured to provide a notification module 104 for clients 112, 114, 116, and the users may be provided with respective user agent modules 106, each configured according to a set of user rules and settings for the corresponding user. In the present exemplary embodiment, user agents 106 run on server 102. In alternative exemplary embodiments, each user agent can run on the individual client being operated by the respective user, or a combination of that client and server 102. A user agent monitors the events that are relevant to the corresponding user and applies the set of rules and settings for the corresponding user. If an event occurs that matches a rule or setting for a user agent, server 102 generates an appropriate notification message. Server 102 then sends the message to the client being used by the user for which the user agent was provided. The message may be, for example, an electronic mail message, an instant message, a voice message, or a wireless phone message. In exemplary embodiments, server 102 may be configured to provide a Web application for clients 112, 114, 116, which can provide, for example, Web-based user interfaces for configuring user agent rules and settings or reading or composing messages for the system provided by server 102. While the exemplary embodiment illustrated in FIG. 1 depicts servers 102 as an individual physical device, the applications provided by the server, or various combinations of these applications, may actually be server applications running on separate physical devices.

In example depicted in FIG. 1, distributed data processing system 100 is the Internet, with network 120 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks such as, for example, an intranet, a local area network (LAN), a wide area network (WAN), or the like. As stated above, FIG. 1 is intended as an example, not as an architectural limitation for different embodiments of the present invention, and therefore, the particular elements depicted in FIG. 1 should not be considered limiting with regard to the environments within which exemplary embodiments of the present invention may be implemented.

Referring now to FIG. 2, an exemplary data processing system within which aspects of exemplary embodiments of the present invention may be implemented is illustrated. Data processing system 200 is an example of a computer system, such as server 102 or client 112 in FIG. 1, within which computer usable code or instructions implementing aspects of exemplary embodiments may be embodied.

In the example depicted in FIG. 2, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

Local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within data processing system 200. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes performed in exemplary embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 in the example depicted in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 in the depicted example, may include one or more devices used to transmit and receive data. A memory may be, for example, main memory 208, ROM 224, or a cache such as that found in NB/MCH 202.

It should be appreciated that the hardware in the examples depicted in FIGS. 1 and 2 may vary in particular implementations. For example, other internal hardware or peripheral devices, such as flash memory, equivalent non-volatile memory, or optical disk drives and the like, may be used in addition to or in place of the hardware depicted in FIGS. 1 and 2. Also, the processes performed in exemplary embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, video game consoles, tablet computers, laptop computers, mobile phones or other communication devices, personal digital assistants (PDAs), and the like. Data processing system 200 may be, for example, a portable computing device that is configured with flash memory to provide non-volatile memory for storing operating system files and/or user-generated data. Essentially, data processing system 200 may be any known or later developed data processing system without architectural limitation.

Exemplary embodiments of the present invention can be implemented to provide methods and systems that can be utilized within a CVE provided by a distributed data processing system (such as the example depicted in FIG. 1) that comprises one or more navigable virtual worlds that each include of a number of interconnected locations, where each location has an associated topic of interest. The one or more virtual worlds are accessible to users of one or more client systems. As used herein, the term "virtual" as used herein can refer to the concept of "in a computer-generated environment or other intangible space." In exemplary embodiments, the locations within a virtual world can be organized similarly to a directory file system, where a location associated with a particular topic can be connected to sub-locations associated with subtopics of the particular topic. Each location and sub-location of a virtual world can be implemented as a grid of a plurality of zones. The number of zones in a particular location corresponds to the size of that location. The avatar representation for each user can traverse or walk through the locations of the virtual world by navigating between adjacent zones. In exemplary embodiments in which the CVE comprises multiple virtual worlds each having a separate layout of interconnected locations, a user logged into the virtual system can select which particular virtual world to navigate during a particular period of time and can switch between virtual worlds during a single session while logged in to the virtual system.

Figure 3:
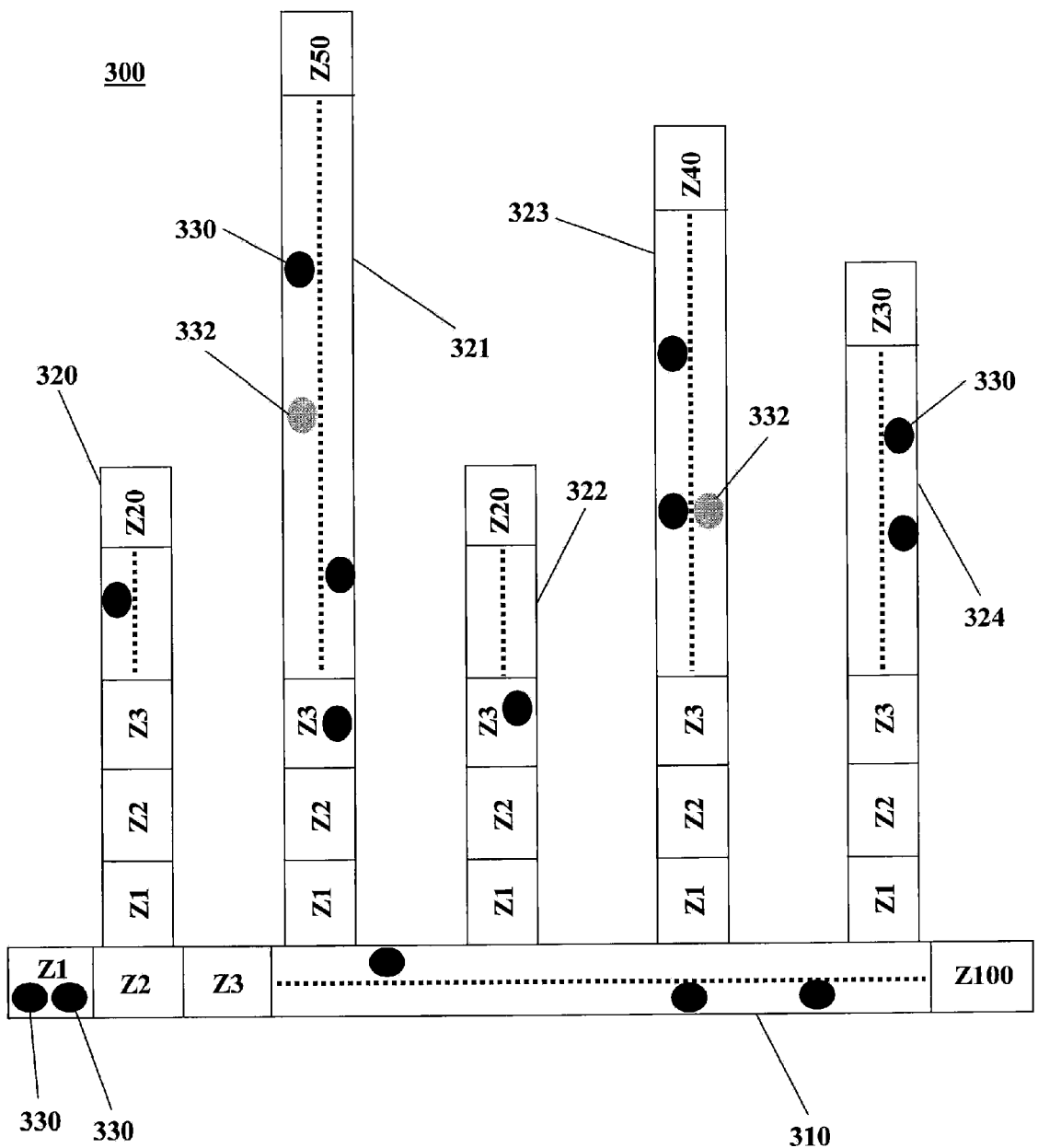
FIG. 3 is an illustration of an exemplary two-dimensional layout for a virtual world in which exemplary embodiments of the present invention may be implemented.

Referring now to FIG. 3, an exemplary embodiment of a two-dimensional virtual world 300 is illustrated. Virtual world 300 is described with reference to a distributed application that can be provided by a distributed processing system (such as the example depicted in FIG. 1) in which each user is associated with their own client computer system separate from the network and servers. Of course, it should be understood, after reading this description, how the system architecture and components can be varied to fit other arrangements, such as multiple users per computer system.

It should be understood that where various functionalities are described as being provided within virtual world 300, these functionalities could be a program executed by a CPU in one or more client and/or server systems, and the various functionalities could be stored in a permanent memory, such as a hard drive or read-only memory (ROM), or in temporary memory, such as random access memory (RAM), in one or more client and/or server systems, and can be accessible by one or more client and/or server systems. Thus, it should also be understood that each of the various functionalities described as being provided within virtual world 300 can be implemented by computer program instructions. These computer program instructions may be provided to a processor or other programmable data processing apparatus to produce a machine, such that the instructions that execute on the processor or other programmable data processing apparatus to implement the various functionalities described. These computer program instructions may also be embodied in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means that implement the functionalities described.

As shown in FIG. 3, two-dimensional virtual world 300 is provided with a layout of interconnected locations in which the locations are corridors representing general instances of real-world informal meeting places (that is, any type of real-world location that facilitates casual interaction between individual passing through that location). In such a virtual meeting place, meetings between users and related activities occur continuously over time. A particular virtual meeting place can be classified according to the metaphor(s) that it adopts for resembling real-world locations that provide possibilities for social engagement (for example, a school or university, a bar that serves drinks, an airport terminal, a video game arcade, etc.).

In the present exemplary embodiment, virtual world 300 represents a metaphor for a shared workplace in which the users, which can be the employees of a business organization for example, can communicate in a shared context and collaborate on shared tasks using shared artifacts. The communication and collaboration provided for can be synchronous or asynchronous. Using this metaphor, a virtual space is provided that can be used by people that are geographically distributed and therefore do not all work together in the same real-world physical location. The corridor layout of virtual world 300 includes a main corridor 310 that is associated with a "General Workplace" topic of interest. Main corridor 310 is thus directed to facilitating collaboration and communication between employees regarding general information about the business organization. The corridor layout of virtual world 300 also includes a number of sub-corridors each connected to main corridor 310 and associated with a subtopic related to the "General Workplace" topic of interest associated with main corridor. In the example illustrated in FIG. 3, the sub-corridors connected to main corridor 310 include a sub-corridor 320 associated with an "Executives" topic of interest, a sub-corridor 321 associated with a "Main Location" topic of interest, a sub-corridor 322 associated with a "Satellite Location" topic of interest, a sub-corridor 323 associated with a "Research & Development" topic of interest, and a sub-corridor 324 associated with a "Marketing" topic of interest.

Each corridor and sub-corridor is configured within virtual world 300 as a grid of plurality of zones. The number of zones in a particular corridor corresponds to the length of that corridor. For example, "Executives" sub-corridor 320 has a length of 20 zones, "Main Location" sub-corridor 321 has a length of 50 zones, and "General Workplace" corridor 310 has a length of 100 zones. In the present exemplary embodiment, "General Workplace" corridor 310, which is the main corridor, has a zone for connecting to each of the sub-corridors. For example, main corridor 310 includes zone 2 connecting to sub-corridor 320. Of course, it should be noted that layout illustrated in FIG. 3 is exemplary only, and exemplary embodiments of the present invention can be implemented within virtual worlds having any number of corridors and sub-corridors each having a length of any number of zones, having any suitable type of corridor structuring, having any suitable associated topics of interest for corridors and sub-corridors, etc. For instance, the set of corridors in a virtual world may be organized similarly to a directory or tree structure, such that a sub-corridor associated with a topic may be further connected to one or more sub-corridors that are associated with narrower subtopics derived from the topic of the broader sub-corridor. Furthermore, implementations within other representations of a virtual world having such a corridor structure are also contemplated to be within the scope of the present invention such as, for example, three-dimensional, textual, auditory, or touch sensation virtual worlds.

In exemplary embodiments, virtual world 300 can be provided by a virtual world server system in communication with a plurality of client systems, such as in distributed data processing system 100 described above with relation to FIG. 1, in which the virtual world is thereby accessible to users operating the one or more client systems via a network. FIG. 3 illustrates a plurality of avatars 330 navigating through the corridors of virtual world 300. Each avatar represents a different user that is currently logged into virtual world 300 to interact with the virtual world and other users currently logged into the virtual world. A user, through his or her avatar representation in the virtual world, may, for example, inhabit the world, navigate through the world to meet other users' avatars, and interact with objects in the world. Each user interacts with a client machine that produces a screen display of the corridor layout from the perspective of the avatar for that user at the location of the user's avatar within the corridor layout.

The current state of the corridor layout of virtual world 300 and of objects within the virtual world can be maintained and continuously updated in a virtual world database maintained by the virtual world server system (for example, maintained by server 102 within storage device 108 of FIG. 1). Portions of the virtual world state maintained on the virtual world server system are continuously downloaded to each of the client systems for users currently logged in to virtual world 300. Objects in the virtual world may be selected by a user or rendered by an application on a display associated with the corresponding client for that user. The user may view and manipulate the objects as provided for by the virtual world application. Manipulation or changes to objects downloaded to client systems are communicated to the virtual world database maintained by the virtual world server system. These updates to the objects within the virtual world database due to changes made by users at client systems are handled automatically and dynamically by the virtual world server system.

So that each user see the correct location of each of the other avatars representing the other users, virtual world server system can be implemented maintain a continuously and dynamically updated record of the current position and orientation of the avatar for each user currently logged in to virtual world 300, and to continuously communicate this dynamically updated position information to each of the client systems being operated by a user that is currently logged in to the virtual world (for example, server 102 of FIG. 1 can communicate this information to clients 112, 114, 116 through notification module 104). The current position and orientation of the avatar for each user is updated as the avatar navigates through the corridors of virtual world 300, and each of the client systems being operated by a user currently logged in to the virtual world can update the movement of other user's avatars that are proximate to the current position of the user's avatar in the current view of corridor being traversed by that user's avatar on the display of the client system being operated by the user.

The avatar representation for each user can traverse or walk through the corridors of virtual world 300 by navigating between adjacent zones. For example, an avatar can traverse "Main Location" sub-corridor 321 by passing from zone 1 to zone 2, then from zone 2 to zone 3, and eventually pass through each zone of sub-corridor 321 in this manner to reach zone 50, which is the end of sub-corridor 321. From there, the avatar can pass from zone 50 to zone 49 and continue zone-by-zone in this manner to return to zone 1 of sub-corridor 321. In another example, an avatar can pass from zone 50 of main corridor 310 to adjacent zone 1 of "Satellite Location" sub-corridor 322 to enter that sub-corridor, and pass from zone 1 of "Satellite Location" sub-corridor 322 to zone 50 of main corridor 310 to exit that sub-corridor and return to the main corridor. Thus, at any given time within virtual world 300, the avatar for each user currently logged into the virtual world is located within one zone of a corridor of the virtual world. Furthermore, the avatars for multiple users can, at any given time within virtual world 300, be concurrently located within the same zone of a particular corridor. The manners in which users may navigate through the virtual world and the manners in which collaboration and communication between users may be facilitated within the corridors of virtual world 300 will be discussed in greater details below.

In exemplary embodiments, each of the corridors of virtual world 300 can provide functionalities for users to create, retrieve, store, and modify various types of multimedia information (for example, text, audio, still images, animation, video, and interactivity content forms, as well as combinations thereof) within that corridor as the user's avatar representation passes through that corridor, as well as for users to otherwise interact with multimedia information previously created within each corridor as the user's avatar representation passes through that corridor, and for users to engage in various types of computer-mediated communication (such as, for example, e-mail, Web forums or message boards, wikis, instant messaging, Internet chat, Web conferencing, Video-conferencing, Voice chat, VoIP, and Webcam chat) with other users as their respective avatar representations pass each other while navigating through the corridors or by using other communication tools provided within virtual world 300. For instance, exemplary embodiments can be implemented to allow a user to create, retrieve, store, and modify multimedia information associated with a particular zone of a particular corridor while the user's avatar is currently located in that zone, as well as to allow two or more users to engage in computer-mediated communication with one another when the avatar for each of these users are located within the same zone of the same corridor. In exemplary embodiments, users may also be provided with options for creating or adding corridors and sub-corridors for new topics and subtopics of interest within virtual world 300, as well as for increasing or decreasing the length of particular corridors.

These functionalities can be made available to users through user interfaces that are provided on client systems being operated the users. A user's interaction through his or her avatar with virtual world 300 and the avatars of other users logged in to the virtual world is controlled through use of data input devices, for example, a keyboard and mouse, for the user's client system in combination with information and actions that are rendered on the display screen of the user's client system (for example, clicking on a clickable object). The user's client system executes client processes that in turn send and receive messages from client processes on the client systems of other users as well as from server processes executing on the virtual world server system over a network. In exemplary embodiments, the various actions that a user that is logged in to virtual world 300 can take through his or her avatar can be provided in the virtual world user interface via pop-up menus or any other suitable user interface elements displayed on the screen display of the client system being operated by the user. The virtual world user interface can also be implemented to provide user interface elements designed to ensure that users logged in to virtual world 300 are continuously aware of the current location of their avatars in the corridor layout, the various objects and the available methods of interacting with those objects provided in locations proximate to the current position within the corridors of the user's avatar, and the avatars of other users in locations proximate to the current position within the corridors of the user's avatar and the available methods of communicating with the avatars of those users through their avatars. For example, in distributed processing system 100 of FIG. 1, notification module 104 can be configured to communicate the information provided through the user interfaces to the client systems of users currently logged in to virtual world 300.

Virtual world 300, by implementing the corridors as described, can therefore be employed to support information structuring and to provide a means to communicate information. Thus, each corridor can contain content objects structured to facilitate learning and collaboration that can be embedded in other activities such as working or social communication. As users navigate through the various corridors in virtual world 300, they begin to structure information relevant to the topics of the corridors in a meaningful way that promotes acquisition of knowledge and collaboration. All of the objects and avatars within virtual world 300 exist only in terms of the computer processes used to generate the virtual world. Hence, even though the word virtual is not always used in describing an object or avatar, it is understood that the object or avatar is always virtual.

Thus, it can be seen that the corridors within virtual world 300 and the interaction that can take place in these corridors can be implemented to resemble impromptu real world informal meeting places where people passing through typically "bump into" one another and can thereby have a resulting conversation on one or more particular subjects of interest. Within such a virtual world, avatars representing users may, for example, walk through the corridors, interact with other avatars passing through the corridors, become involved in meetings with other avatars passing through the corridors, and locate avatars representing particular users or experts on a particular topic of interest associated with a corridor. Such an implementation can enable users in different physical locations to meet and communicate in virtual space. For example, a user whose avatar is passing through a particular corridor may be provided with the ability to introduce oneself to, be introduced to, and otherwise greet the users of other avatars that happen to pass the user's avatar in the particular corridor (that is, when each of these users is currently located in the same zone of the same corridor), engage in a chat session with one or more of these users (using computer-mediated conferencing technology such as, for example, instant messaging or Voice over Internet Protocol (VoIP)), "listen in" to a chat session being held between two or more these users, receive a notification when a particular user's avatar is near the user's avatar in the corridor, and post a question within a zone of a corridor (or within a corridor generally) that may be answered by the users of other avatars passing through the corridor currently or at a later time (and receive a notification when an answer to the question is posted by another user). In exemplary embodiments, users can be provided with options to keep their interactions fully or partially confidential between a limited number of users.

Exemplary embodiments of the present invention can be implemented to provide a rules-based module by which the navigation of avatar representations of the users logged into virtual world 300 through the corridors is automatically determined and directed according to avatar navigation settings and rules for each particular user. Thus, using this navigation module, a user's avatar is automatically directed to traverse the corridors without manual intervention from the user. For example, for an implementation of virtual world 300 within distributed data processing system 100 illustrated in FIG. 1, the avatar navigation settings and rules can be maintained for each user by their respective user agent module, and a navigation module for each user can be implemented within that user's corresponding user agent to automatically determine and direct navigation of that user through the corridors of virtual world 300 according the avatar navigation settings and rules for that user.

In exemplary embodiments, the navigation module for a user can be implemented to, according to the avatar navigation settings and rules for the user, direct the user's avatar to traverse or walk through particular corridors in virtual world 300 in a particular order, to traverse particular corridors more frequently than other corridors, and/or to traverse particular corridors at particular rates (that is, the navigation module may direct a user's avatar to traverse certain corridors at a more rapid pace or at a slower pace than others). In exemplary embodiments, the navigation module can be implemented to direct a user's avatar to traverse the full length of each corridor sequentially zone-by-zone from the beginning zone to the end zone, and then back from the end zone to the beginning zone. For example, when the navigation module has determined that the "Marketing" sub-corridor 324 is the next corridor the user's avatar will be directed through, the navigation module will first direct the user's avatar to zone 1 of sub-corridor 324, then zone-by-zone through sub-corridor 324 to zone 30, and then back to zone 1 zone-by-zone through sub-corridor. In this manner, the user's avatar will have an opportunity to interact with (that is, be located in the same zone as) each of the other users whose avatars are traversing the same corridor during the time the user's avatar is traversing the corridor. When navigating a user's avatar from one sub-corridor to another, the navigation module will direct the avatar to pass sequentially through the zones of main corridor 310 between the two sub-corridors. In this manner, users will have an opportunity for chance encounters with other users when their respective avatars are located in the same zone in main corridor 310. When a user, through the user interface provided on the user's client system, signals a desire for interaction with an object or another avatar within virtual world 300, the navigation module for that user can pause the movement of the user's avatar within the corridor layout to allow for the interaction to take place. When the user signals that the interaction is complete, the navigation module can restart movement of the user's avatar within the corridor layout.

In exemplary embodiments, the avatar navigation settings and rules for each particular user can include a specified level of interest in each of the topics associated with the corridors of virtual world 300 and specified level of expertise in each of the topics associated with the corridors of the virtual world. For example, a level of interest or a level of expertise for a particular topic can be specified by a user to that user's corresponding user agent as a number on a scale from 0 to 10, with 0 representing no interest or expertise in the topic, 1 representing the least interest or expertise in the topic, and 10 representing the most interest or expertise in the topic. In exemplary embodiments, the navigation module can be implemented to specify a default level of interest and/or expertise of 1 for corridors for which the user has not yet specified these levels.

In these situations, the navigation module for the user can be implemented, for example, to influence the user's avatar to traverse corridors for which the user has specified a higher level of interest and/or expertise prior to traversing corridors for which the user has specified a lower level of interest and/or expertise, to traverse corridors for which the user has specified a higher level of interest and/or expertise more frequently than corridors for which the user has specified a lower level of interest and/or expertise, and/or to traverse corridors for which the user has specified a higher level of interest and/or expertise at a slower pace than corridors for which the user has specified a lower level of interest and/or expertise. For example, the rate at which the navigation module will direct a user's avatar to traverse a particular corridor can be calculated as a function of the user's specified levels of interest and expertise for corridor. The navigation module will the direct the user's avatar to traverse corridors for which the user has specified higher levels of interest and expertise at a slower rate, and therefore, the total amount of time a user's avatar will take to traverse a particular corridor will depend on the levels of interest and expertise specified by the user for that corridor and the length of that corridor (that is, the number of zones), as well as the amount of interaction the user engages in with objects and other avatars in that corridor. Implemented in such a fashion, the navigation module will increase the likelihood that avatars representing users having higher levels of interest and/or expertise in particular topics associated with a corridor of virtual world 300 will encounter one another within the corresponding corridors and thereby be able to communicate and collaborate on issues regarding the particular topics.

In exemplary embodiments, the navigation module can be further implemented to allow each user to specify other avatar navigation settings and rules for influencing the automatic navigation of that user's avatar within virtual world 300. For example, the navigation module can be implemented to allow each user to specify, within the avatar navigation settings and rules for that user, one or more other users with which the user desires to encounter in virtual world 300. When a user specifies another user in this fashion, the navigation module will influence the user's avatar to traverse through the corridors of virtual world 300 toward the location of the specified user's avatar within the corridors of the virtual world. For example, the navigation module can assign a priority to the corridor within which the specified user is presently located. The navigation module can also be implemented to influence the user's avatar to traverse through the corridors at an increased rate to attempt to "meet" the specified user's avatar.

In exemplary embodiments, the navigation module can implement one or more algorithms to determine how to handle multiple dependencies that arise for a particular user's avatar navigation settings and rules. For example, the navigation module can, whenever a user has specified another user with which the user desires to communicate, always direct a user's avatar to traverse through the corridors of virtual world 300 toward the location of the specified user's avatar within the corridors of the virtual world. Where the user has specified multiple users with which the user desires to communicate, the navigation module can give the highest priority to corridors having the highest number of specified users currently therewithin. Where more than one corridors have an equal number of specified users, the navigation module can determine which corridor is given higher priority according to the other avatar navigation settings and rules for that user. Once the navigation module has directed the user's avatar to traverse the corridors of virtual world 300 where each other user the user has specified a desire to communicate with are located, the navigation module can then direct the user's avatar to traverse the different corridors of the virtual world in an order from the associated topic for which the user has specified the highest interest level to the associated topic for which the user has specified the lowest interest level. Where the user has specified the same level of interest for the topics of more than one corridor, the navigation module can direct the user's avatar to traverse these corridors in the order of the associated topic for which the user has specified the highest expertise level to the associated topic for which the user has specified the lowest expertise level. Where the user has specified the same level of interest and the same level of expertise for the topics of more than one corridor, the navigation module can direct the user's avatar to traverse these corridors in a randomly or pseudo-randomly generated order. If there are no specified users with which the user desires to communicate in a particular corridor, where the user has specified levels of no interest and no expertise for the topic associated with the particular corridor, the navigation module can be implemented so that the user's avatar is not directed through that corridor. In exemplary embodiments, the navigation module can further be implemented to assign a lower priority to corridors that the user's avatar has traversed most recently.

Exemplary embodiments can be implemented to provide a user interface element through which a user can initially specify, as well as later modify, the navigation settings and rules for the user's avatar. The user interface element can be provided, for example, within virtual world 300 each time a user logs into the virtual world and/or implemented as a menu option within a user interface provided by the virtual world. In the exemplary embodiment illustrated in FIG. 4, this user interface element is provided as a navigation settings window 400 that has an area 410 displaying a list of available corridors 410, a first section 412 for specifying a level of interest for each corridor, and a second section 414 for specifying a level of expertise for each corridor. The sections for specifying a level of interest can be provided, for example, as drop-down list interface elements. Navigation settings window 400 may also provide a module for indicating which corridors of the list of corridors have been recently added or for which corridors the user has yet to specify levels of expertise and/or interest. Navigation settings window 400 is further shown as including an interface element 420 through which a user may specify other users with which the user wishes to communicate, for example, either by typing an identification for the other users into a text box or selecting an identification for the other users from a drop-down list. Navigation settings window 400 also includes an area 422 for displaying the list of other users with which the user has specified a desire to communicate. An identifier for each other specified user is displayed in area 422 until the user's avatar has encountered the other specified user's avatar in virtual world 300. Navigation settings window 400 also includes a cancel button 402 for discarding changes made to the avatar navigation settings and rules through the window and rules and a submit button 404 for submitting changes made to the avatar navigation settings and rules through the window.

Figure 4:
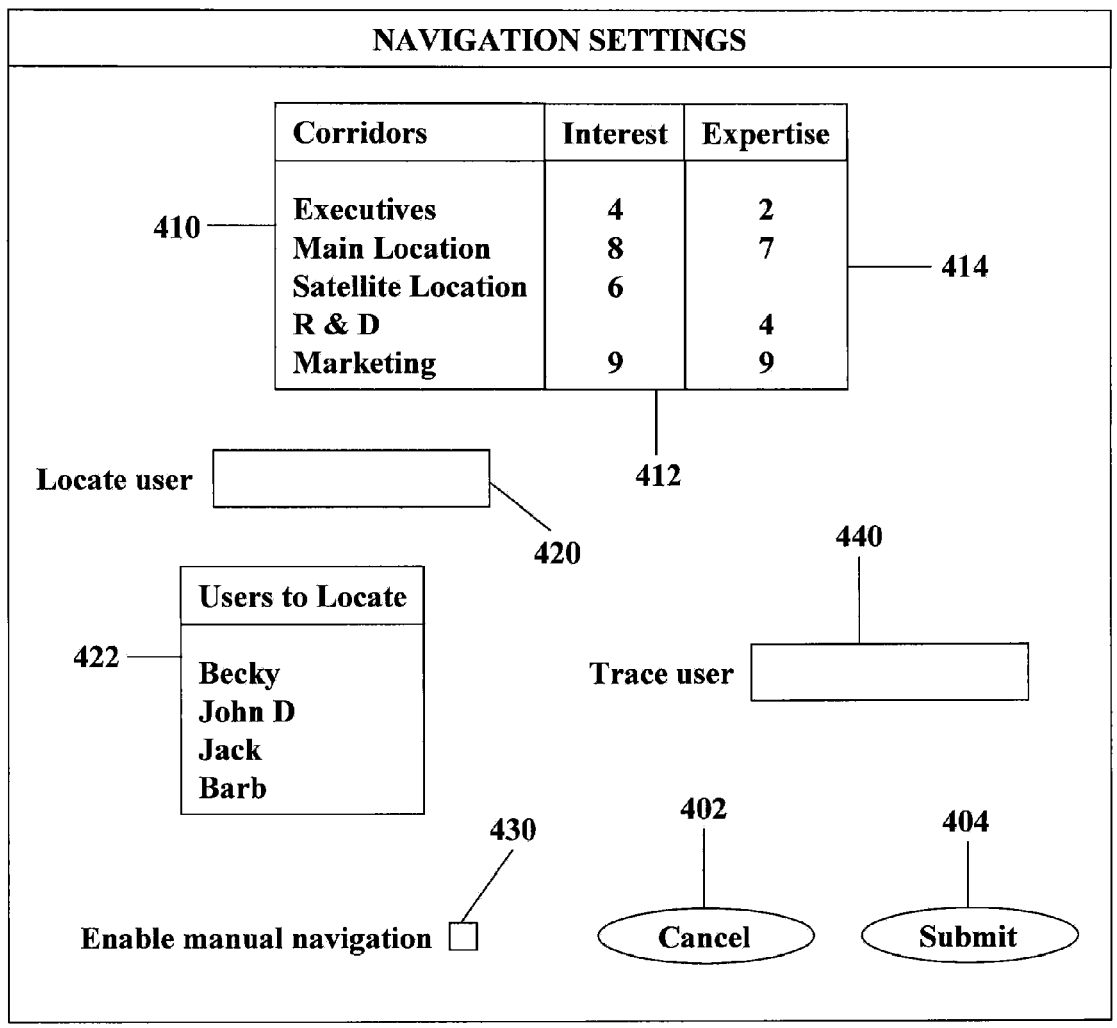
FIG. 4 is an illustration of an exemplary embodiment of a navigation settings user interface window in accordance with the present invention.

Exemplary embodiments of the present invention can further implement an option for users to manually override the automatic direction of the navigation module and thereby allow users to manually control navigation of their respective avatars within the corridors of virtual world. As shown in FIG. 4, this option can be provided as a check box 430 in navigation settings window 400 to allow users to toggle between manual and automatic navigation. When manually navigation is selected, a user will then be able to manually direct his or her avatar through the corridors of virtual world 300 using a user interface provided by the virtual world. For example, a common user interface for navigation in virtual environments is the WASD interface, where the virtual world is rendered from the perspective of the user's avatar and the "W" key moves the avatar forward, the "A" key turns the avatar left, the "S" key moves the avatar backward, and the "D" key moves the avatar right.

In exemplary embodiments, the navigation module can be implemented to provide an option for a user logged into virtual world 300 to have their avatar directed through the corridors to trace a route previously taken by another user's avatar within the corridor layout. In an example implementation, the virtual world server system can be configured to maintain a history record of the corridors traversed by the avatar representation for each user having an account registered with virtual world 300. The history record for each user can also specify the order the corridors were visited by that user.

When a user selects the option to trace a route previously taken by another user's avatar within the corridor layout, the navigation module will direct the user's avatar to navigate through the corridors of virtual world 300 according to the history record for that other user's avatar. In exemplary embodiments, the virtual world server can be configured to maintain the history record for each user to store the most recently visited corridors for that user, in which case the navigation module can be implemented to navigate the avatar representation of another user selecting to trace the route taken by the user starting from the least recently visited corridor listed in the history record to the most recently visited corridor listed in the history record. For example, the virtual world server can be configured to store a predetermined number of the most recently visited zones or corridors for each user in the history record for that user or, alternatively, the most recently visited corridors over a predetermined period of time for each user in the history record for that user. The virtual world server may also be configured to dynamically update the history record for each user as the user traverses the corridors while logged in to virtual world 300. In exemplary embodiments, a user can also be provided with an option to select a predetermined starting point in another user's history record from where the navigation module will begin directing the user's avatar to trace the route of the other user. Where the user of an avatar having a route being traced by another user avatar has logged off of virtual world 300 or otherwise discontinued navigation, the avatar of the user that is tracing the route will be directed to follow the route stored in the other user's history record to traverse the corridors that the other user has traversed through the most recently traversed corridor by the other user. Upon directing avatar of the user tracing the route through this most recently traversed corridor, the navigation module will return to the navigation settings for the user's avatar prior to the user's selection to trace taken by the other avatar.

As shown in FIG. 4, this option the option to trace a route previously taken by another user's avatar within the corridor layout can be provided through an interface element 440 in navigation settings window 400 through which a user may specify another user whose recent avatar route the user wishes to trace, for example, either by typing an identification for the other users into a text box or selecting an identification for the other users from a drop-down list.

Exemplary embodiments of the present invention can also be implemented to provide a shadow module that provides users logged into virtual world 300 having a high level of expertise in a particular topic to create and store a shadow indication of their willingness to correspond with other users regarding the subject matter of that topic in the particular corridor associated with that topic. For example, as shown in FIG. 3, the shadow module can be implemented to allow a user to store a shadowed representation 332 of his or her avatar representation in an individual zone of a corridor associated with a topic in which the user has specified a high level of expertise. The shadowed (or, alternatively, holographic) representation of that user's avatar will persist in that zone even after the user's avatar has navigated away from that corridor to another corridor. The ability leave such a shadowed avatar representation can be provided to users through the user interface of virtual world 300. For example, a user may be able leave shadowed avatar representation by inputting a particular keystroke and/or mouse-click combination or by selecting the option from a menu provided by virtual world 300.

The shadow module can be implemented such that the avatar representations for users navigating through virtual world 300 will encounter the shadow indications left by other users having a high level of expertise in a particular topic while traversing the corridor associated with that topic. When a user's avatar encounters a shadow indication in this manner, the user will thus be able to recognize that the shadow indication was left by another user having a high level of expertise in the topic associated with the corridor currently being traversed, and the shadow module can be implemented to provide, through the virtual world user interface on the client system being operated by the user, one or more selectable actions that the user may take to correspond with the user that created the encountered shadow indication. In exemplary embodiments, these actions can include specifying an interest to communicate with the user that created the encountered shadow indication in the encountering user's avatar navigation settings and rules, inviting the user that created the encountered shadow indication to an instant messaging session (if the user that created the encountered shadow indication is presently logged into virtual world 300), sending an email message to the user that created the encountered shadow indication, and posting a question in the corridor (for example, by creating or posting to a Web-forum or message board instance associated with the shadow indication or the zone in which the shadow indication is stored and encountered) that the user that created the encountered shadow indication can be provided an opportunity to respond to (for example, using any of the one or more selectable actions made available to the user posting the question upon encountering the shadow indication) the next time that user's avatar traverses the corridor in which he or she created the shadow indication. In exemplary embodiments in which a navigation module is implemented as described above to provide an option for user logged into virtual world 300 to have their avatar directed through the corridors to trace a route previously taken by another user's avatar, these actions may also include specifying that the navigation module direct the user to trace a stored, previously taken route or path within the corridor layout by the user that created the encountered shadow indication. Thus, exemplary embodiments implementing a shadow module in this manner can enhance the ability of a user having an interest in a particular topic to communicate with another user having a high level of expertise in that topic, as well as become acclimated with the other interests of the user having a high level of expertise in that topic.

In exemplary embodiments, the shadow indications can be instantiated as multimedia objects that can store and provide users navigating through virtual world 300 access to persisted information such as transcripts of instant messaging sessions that the user that created the shadow indication participated in regarding the topic associated with the corridor in which the shadow indication was created (for example, a transcript of a chat session the user that created the shadow indication participated in upon encountering another user's avatar in virtual world 300), Web-forum or message board instances directed to the topic associated with the corridor in which the shadow indication was created, or any other type of multimedia information that the user that created the shadow indication elects to associated with the shadow indication.

In exemplary embodiments, the various functionalities provided within virtual world 300, as described above, such as the navigation module and/or the shadow module could be configured to be incorporated within one or more of the client systems and/or the virtual world server system as a plug-in, add-on, or extension supported by the server system or client systems. As used herein, the term "plug-in" can refer is a software application or module program, or one or more computer instructions, which may or may not be in communication with other software applications or modules, that interacts with a host application to provide specified functionality, and which may include any file, image, graphic, icon, audio, video, or any other attachment. As used herein, the term module can refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. In this document, the terms "computer program medium," "computer usable medium," and "computer readable medium" are used to generally refer to media provided as main memory, secondary memory, removable storage drives, a hard disk installed in a hard disk drive, and signals in a computer system. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. These computer program products are means for providing software to the computer system. It can be used, for example, to transport information, such as data and computer instructions, between computer systems. Furthermore, the computer readable medium may comprise computer readable information in a transitory state medium such as a network link and/or a network interface, including a wired network or a wireless network that allows a computer to read such computer readable information.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. An apparatus providing for virtual communication and collaboration, the apparatus comprising:

a collaborative virtual environment application executing within a distributed data processing system and accessible to a plurality of users through one or more client systems communicatively connected via a network, the collaborative virtual environment application providing a persistent virtual world represented as a grid of an interconnected set of locations each divided into a set of zones and each having an assigned context, the users of the plurality of users simultaneously and continuously perceiving and interacting with the persistent virtual world through a user interface provided to the plurality of users through the one or more client systems, the collaborative virtual environment providing each user of the plurality of users with a respective avatar representation for navigating and interacting with each other user of the plurality of users and objects within the locations of the persistent virtual world; and a navigation module implemented within the collaborative virtual environment application, the navigation module providing a user interface element implemented within the user interface for each user of the plurality of users to specify a respective set of navigation settings, the navigation module automatically directing the avatar representation for each user of the plurality of the users to traverse the set of zones of a respective subset of the set of locations of the persistent virtual world in a particular order of locations and at a particular rate for each location without user intervention, the navigation module determining the particular order of locations and the particular rate for each location for each user according to the respective set of navigation settings specified by the user; wherein the navigation module is configured to direct the avatar representation for each user to traverse the locations of the respective subset of the set of locations for which the user has specified a higher level of interest in the assigned contexts for the locations prior to traversing the locations of the respective subset of the set of locations for which the user has specified a lower level of interest in the assigned contexts for the locations, and wherein the navigation module is configured to direct the avatar representation for each user to traverse the locations of the respective subset of the set of locations for which the user has specified a higher level of expertise in the assigned contexts for the locations at a slower rate than the locations of the respective subset of the set of locations for which the user has specified a lower level of expertise in the assigned contexts for the locations; and wherein the collaborative virtual environment application maintains a traversal history record for each user of the plurality of users in one or more data stores within the distributed processing system, wherein the collaborative virtual environment application dynamically updates the traversal history record for each user to include an ordered listing of a specified number of the most recently traversed locations by the avatar representation for the user within the persistent virtual world, wherein the user interface element implemented within the user interface for each user of the plurality of users to specify the respective set of navigation settings includes a trace option selectable by the user to specify a second user of the plurality of users to follow within the persistent virtual world, and wherein the navigation module directs the avatar representation for each user of the plurality of the users that has selected the trace option to traverse through the set of locations of the persistent virtual world by following the ordered listing of the specified number of the most recently traversed locations by the avatar representation for the second user specified using the trace option.

2. The apparatus of claim 1, wherein the respective set of navigation settings for each user of the plurality of users includes a level of interest in the assigned context for each location of the set of locations and a level of expertise in the assigned context for each location of the set of locations.

3. The apparatus of claim 1, wherein the respective set of navigation settings for each user of the plurality of users includes a list of one or more other users of the plurality of users with which the user desires to communicate, wherein the navigation module is configured to include the locations of the set of locations within which each of the one or more other users specified by the user in the list are currently located in the respective subset of the set of locations for the user, and wherein the navigation module is configured to direct the avatar representation for each user to traverse the locations of the set of locations within which each of the one or more other users specified by the user in the list are currently located prior to traversing the other locations of the respective subset of the set of locations.

4. The apparatus of claim 1, wherein the user interface element implemented within the user interface for each user of the plurality of users to specify the respective set of navigation settings includes an option that is selectable by the user to disable automatic direction of the avatar representation for the user by the navigation module, and wherein the navigation module directs the avatar representation for each user of the plurality of the users that has selected the option to disable automatic direction through the set of locations of the persistent virtual world according to input received from one or more data input devices of the client system being operated by the user.

* * * * *